United States Patent [19]

Chelette et al.

[11] Patent Number: 4,893,844
[45] Date of Patent: Jan. 16, 1990

[54] TUBULAR COUPLING WITH VENTABLE SEAL

[75] Inventors: K. Darrel Chelette, Katy; Charles A. Bollfrass, Houston, both of Tex.

[73] Assignee: Baker Hughes Incorporated, Houston, Tex.

[21] Appl. No.: 771,137

[22] Filed: Aug. 28, 1985

Related U.S. Application Data

[63] Continuation of Ser. No. 489,752, Apr. 29, 1983, abandoned.

[51] Int. Cl.⁴ .............................................. F16L 15/04
[52] U.S. Cl. .................................... 285/113; 285/334; 285/924; 285/351
[58] Field of Search .................... 277/1, 168; 285/109, 285/113, 347, 351, 355, 370, 354, DIG. 25, 333, 334; 166/82, 86; 251/175, 344

[56] References Cited

U.S. PATENT DOCUMENTS

| 2,006,520 | 7/1935 | Stone et al. | 285/146 |
| 2,110,825 | 3/1938 | Archer | 285/113 |
| 2,444,119 | 6/1948 | Thorn et al. | 277/177 |
| 2,516,743 | 7/1950 | Allin | 285/347 X |
| 2,614,793 | 10/1952 | Storm | 277/168 |
| 2,657,825 | 11/1953 | Erickson | 285/113 X |
| 2,907,589 | 10/1959 | Knox | 285/95 |
| 2,992,019 | 7/1961 | MacArthur | 285/110 |
| 3,047,316 | 7/1962 | Wehring et al. | 285/334 |
| 3,100,656 | 8/1963 | MacArthur | 285/55 |
| 3,160,427 | 12/1964 | Natho | 285/215 |
| 3,355,142 | 11/1967 | Kammerer, Jr. et al. | 285/347 X |
| 3,359,013 | 12/1967 | Knox et al. | 285/13 |
| 3,404,902 | 10/1968 | Latham et al. | 285/14 |
| 3,489,438 | 1/1970 | McClure | 285/334 X |
| 3,508,771 | 4/1970 | Duret | 285/355 X |
| 3,572,777 | 3/1971 | Blose et al. | 285/334 |
| 3,850,461 | 11/1974 | Fujioka et al. | 285/322.2 |
| 3,870,351 | 3/1975 | Matsuki | 285/334 |
| 4,009,893 | 3/1977 | Schatton et al. | 285/110 |
| 4,026,583 | 5/1977 | Gottlieb | 385/55 |
| 4,085,951 | 4/1978 | Morris | 285/334 |
| 4,253,687 | 3/1981 | Maples | 285/332.3 |
| 4,433,862 | 2/1984 | Raulins et al. | 285/334 X |
| 4,537,429 | 8/1985 | Landriault | 285/351 X |

FOREIGN PATENT DOCUMENTS

| 635412 | 1/1962 | Canada . |
| 2622944 | 3/1977 | Fed. Rep. of Germany . |
| 663403 | 5/1964 | Italy . |

OTHER PUBLICATIONS

American Petroleum Inst. (API), Drilling and Production Practice of 1949-Copyright 1950, Kelly pp. 385, 387, 390.
Publication evidencing a casing connection as manufactured by the Hydril Company, page number and date of publication unknown.

Primary Examiner—Gary L. Smith
Assistant Examiner—Eric K. Nicholson
Attorney, Agent, or Firm—Robert A. Felsman

[57] ABSTRACT

A deformable sealing member is disposed between two surfaces such that a space is provided to at least one side of such sealing member. A smaller space may be provided to a second side of the sealing member. The sealing member is conformed to contact both surfaces. A pressure coming from the direction of the greater space between the two surfaces will cause the sealing member to deform into greater compliance with the two surfaces. However, should pressure reverse and approach the seal from the opposite direction the seal will distort into the area of greater space thereby causing the seal to break contact with one of the surfaces and for such pressure to vent past the seal.

2 Claims, 2 Drawing Sheets

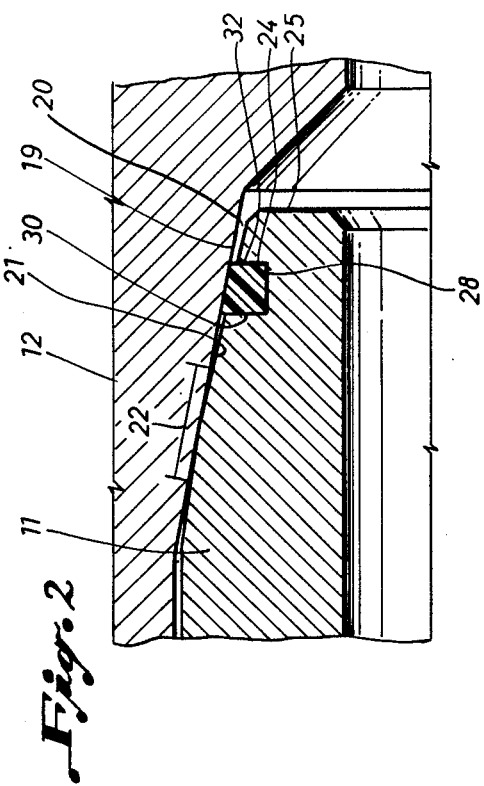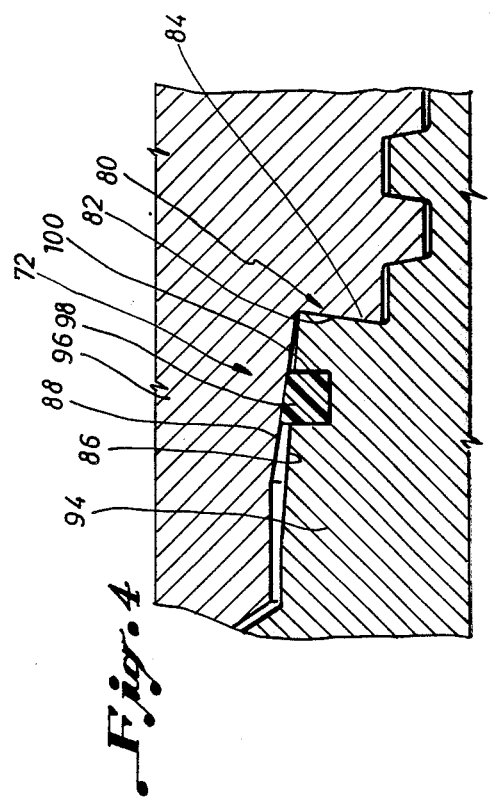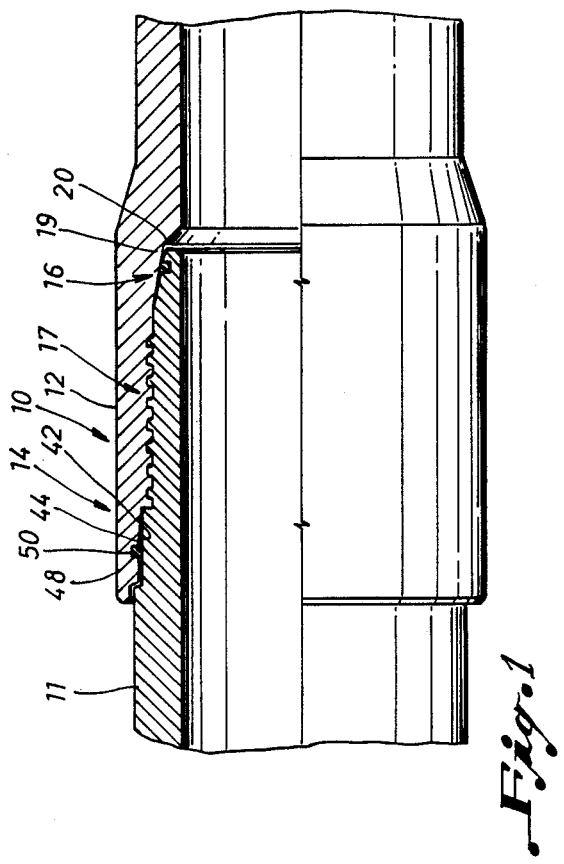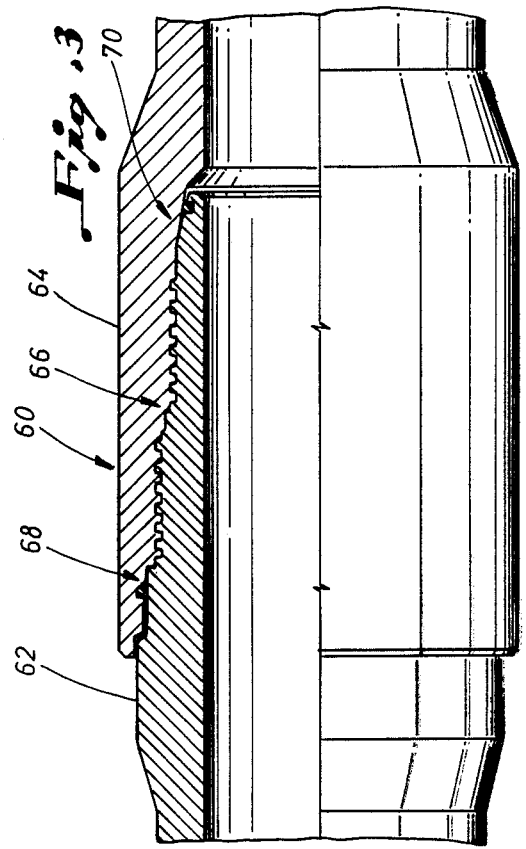

TUBULAR COUPLING WITH VENTABLE SEAL

This application is a continuation of application Ser. No. 489,752, filed Apr. 29, 1983, now abandoned.

BACKGROUND OF THE INVENTION

This invention relates generally to methods and apparatus for sealing and more specifically relates to methods and apparatus for sealably coupling tubular members such that an occlusive seal is formed in response to pressure from a first direction, but that the seal will vent pressure from a second direction.

In many applications, and particularly in applications commonly found in the oil and gas industry, it is necessary and desirable to couple tubular members together such that an occlusive seal is formed and will be maintained, even under conditions involving severe temperatures and pressures. In the oil and gas industry, this need typically arises with regard to well casing and tubing which typically must be capable of achieving such sealing through multiple cycles of coupling and uncoupling of the members.

Several mechanisms have been used by the prior art to attempt to provide the characteristics described above. Oilfield tubular members, such as well casing and tubing typically have member having a male thread or pin end designed to engage an axially aligned tubular member having a female thread or box end. It is known in the art to seal between the members by using a metal-to-metal seal. Often, the box end will have a section exhibiting a frusto-conical aperture profile. The pin end will then have a section having a generally frusto-conical profile except that the surface will have an axial peripheral bow, causing the section to exhibit a convex profile which is non-complementary to the corresponding seal surface of the box end. When the pin and box ends are threadably coupled to the designed thread stop, the convex surface of the pin engages the surface of the frusto-conical section of the box, forming a point-of-contact metal-to-metal seal. To achieve the desired sealing the mutually-engaging surfaces of the pin and box must be smooth and true, and are often highly polished to achieve this end.

Another form of metal-to-metal seal exhibits complementary abutting shoulders on the pin and box such that the shoulders engage one another upon threaded coupling, often providing a thread stop for the coupling. Again, engaging surfaces of the seal must be in extremely smooth condition to effect a suitable seal.

As the pressures to which such a seal is subjected rise, the criticalness of the condition of the contact surfaces increases. It is not uncommon for damage to occur to the engaging seal surfaces of the tubular members, particularly to that of the pin member, through contact during handling or during stabbing of the members prior to rotation for engagement. Metal-to-metal seals are also often susceptible to damage resulting from corrosive environments which attack the surface integrity of the seals. Further, metal-to-metal seals often vent to pressure from a secondary direction at a lower pressure than that at which they sealed in response to pressure from a primary direction. After this venting, the seals do not necessarily return to sealing against fluid pressures from the primary direction equal to those which were originally sealed against.

In an attempt to cure some of these deficiencies, the prior art has supplemented the metal-to-metal seals with deformable plastic seals adapted to be compressed between the two members and seal therebetween. These plastic seals provide a secondary or backup seal to the metal-to-metal seal. The secondary plastic seals may be situated adjacent the metal-to-metal seals or may be placed in grooves adjacent the thread coupling or in the thread coupling itself.

Several difficulties are presented by the use of these plastic seals. Initially, because the seals are compressed directly between two surfaces, the seals typically vent at equal pressures from both primary and secondary directions, thereby effectively sealing only up to a threshold level at which the seal vents. A major difficulty with the plastic seals is that they typically have a thermal coefficient of expansion which is 6 to 10 times that of the steel parts with which they are associated. Two significant problems thus result. First, as temperature rises, the plastic seals will expand to an extent much greater than will the tubular members. Therefore, the plastic seals act as a wedge, actively forcing the metal members apart. This can cause not only a reduction or elimination of the integrity of the metal-to-metal seals, but can also separate the thread annulus such that the tensile efficiency of the connection is reduced. Secondly, where the secondary plastic seals are situated such that a fluid leaking past the primary seal may enter the thread annulus, because of the essentially non-venting characteristics of the plastic seals, the fluid may be trapped within the thread annulus where it may expand and again weaken the integrity of the threaded coupling.

Accordingly, the present invention provides a method and apparatus for forming a self-energizing seal between two tubular members, such seal engaging in response to pressure from a primary direction while venting to pressure from a secondary direction, thereby maintaining the integrity of the metal-to-metal seal and thread annulus.

SUMMARY OF THE INVENTION

Two members adapted to be coupled together are conformed such that when the members are coupled, one in inserted engagement within the other, they will have surfaces in proximate relation to one another. An elastic sealing member is retained to one surface, preferably by means of a groove within the surface of one of the members. To at least one side of the seal member, a first gap or void will be formed between the two surfaces, this gap to the side of the seal from which pressure to be sealed against will flow. There may be either a second smaller gap or no gap between the surfaces on the opposite side of the seal member, the side from which pressure to be vented will flow. In response to a pressure in the larger gap between the two surfaces, the sealing member will deform, into the narrower void on the opposite side of the sealing member if such is present, occupying such void and providing an occlusive seal between the two members. Similarly, in response to a pressure from the contacting or most convergent area between the two surfaces, the seal will distort and flow into the wider void between the two surfaces, thus causing the sealing member to lose contact with one of the surfaces, thus allowing such pressure to vent past the sealing member.

BRIEF DESCRIPTION OF THE DRAWINGS

FIG. 1 illustrates a coupling between two tubular members having upper and lower sealing segments in accordance with the present invention, illustrated partially in cross section.

FIG. 2 depicts the lower sealing segment of the coupling of FIG. 1, illustrated in cross section.

FIG. 3 illustrates a coupling between two tubular members, such coupling having a step-thread design between the upper and lower sealing segments, illustrated partially in cross section.

FIG. 4 illustrates the upper sealing segment of the coupling of FIG. 5.

DETAILED DESCRIPTION OF A PREFERRED EMBODIMENT

Figure 5:
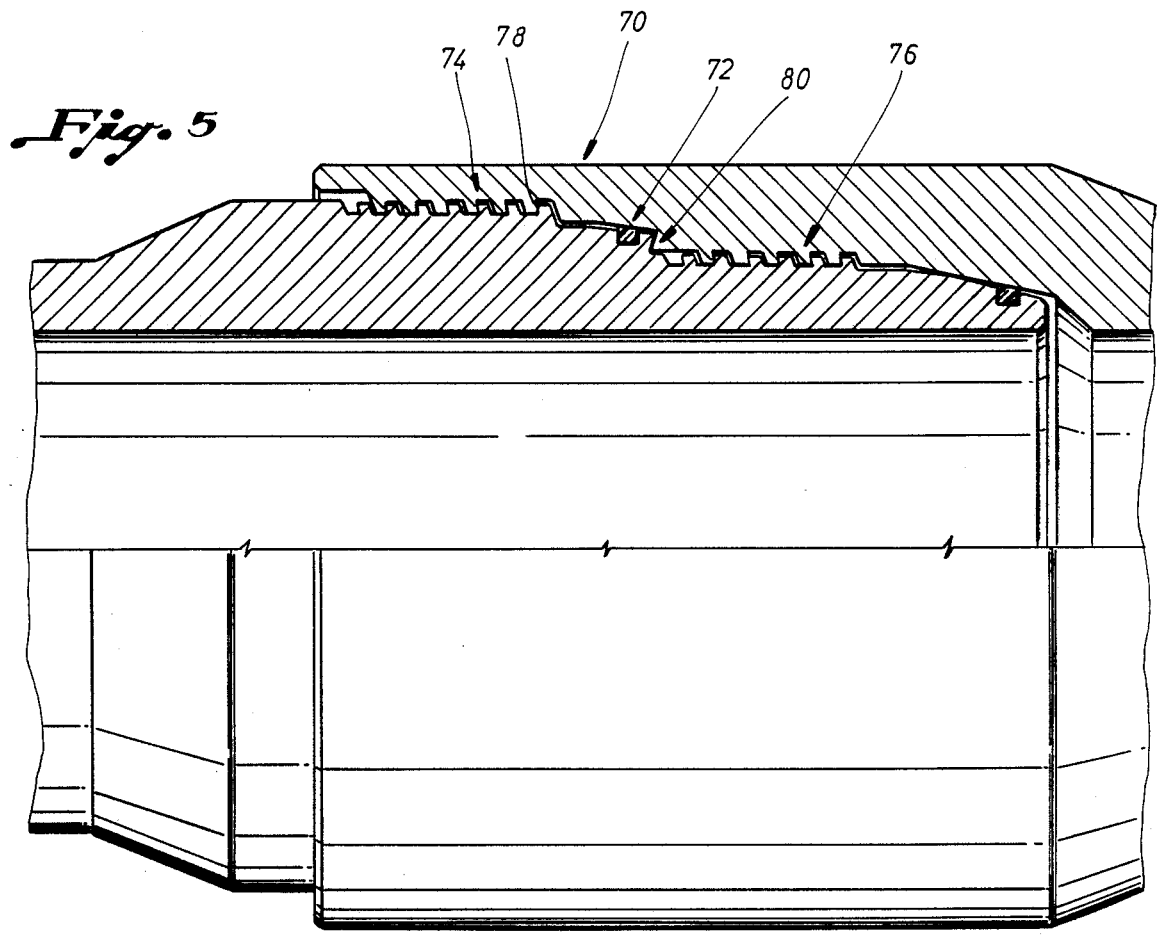
FIG. 5 depicts a coupling of two tubular members including two sealing segments in accordance with the present invention, such coupling also having a step-thread design and such threads having negative angle load flanks, such coupling depicted partially in cross section.

Referring now to the drawings in more detail, particularly to FIG. 1, therein is illustrated a coupling 10 between two tubular members 11 and 12 including the sealing mechanism the present invention. The tubular members shown in FIGS. 1 through 6 are segments of well casing or tubing, such members being an environment in which the sealing mechanism of the present invention has particularly significant applicability. It is to be clearly understood that although the sealing mechanism will be described and illustrated in respect to well tubing or casing, the sealing mechanism may be suitable for uses with various other forms of well products, such as casing hangers or packers and may have applicability in environments wholly unrelated to well products.

First member 11 has a threaded pin end and second member 12 has a complimentarily threaded box end. It will be seen that the thread coupling between members 11 and 12 extends continuously between upper and lower sealing segments 14 and 16, respectively. The illustrated coupling of first member 11 and second member 12 has an "upset" of flared dimension to the box end of second member 12. It is to be understood that the present invention is suitable for use with smooth joint couplings also. In this particular preferred embodiment, each seal segment includes a metal-to-metal seal and a deformable seal.

Referring now to FIG. 2 of the drawings, therein is illustrated in greater detail lower seal segment 16 of coupling 10 of FIG. 1. As discussed above, the box end of second member 12 has a wall section 19 which defines aperture 20 having a frusto-conical profile. The pin end of tubular member 11 presents a convex surface 21 to wall surface 19 such that a metal-to-metal seal is established at contact area 22 between the two surfaces. It will be seen that, upon the forces of assembly, surfaces 19 and 21 will typically diverge from contact area 22, at least in the direction of adjacent end 25 of first member 11, the direction from which pressure to be sealed against will flow. This angle of divergence may vary in proportions, but is typically within a range of from virtually 0° to 20° of divergence. While such a range is not a limitation on the present invention, the preferred angle of divergence will preferably be on the order of from 0° to 10°. It will be understood that although this divergence is not necessary for the practice of the present invention, this divergence will often occur, either through geometric design of the two members and/or through the forces exerted upon the members through the torque loading of coupling and fluid pressures within the members.

First member 11 contains a circumferential groove 24 between contact area 22 and end 25 of first member 11. Upper edge 30 of groove 24 may be directly adjacent a lower boundary of contact area 24 or may be situated along the distance intermediate contact area 22 and end 25 of first member 11. Surface 21 at lower edge 32 of groove 24 will not contact surface 19 but will define a gap between surfaces 19 and 21 at that location. This gap may be formed by a continuation of a divergent angle originating at or towards contact area 22, as illustrated in FIG. 2, or may be formed by an abrupt reduction in diameter of first member 11 at lower edge 32 of groove 24, as indicated generally in FIG. 6. Situated in groove 24 is seal member 26. Seal member 26 is preferably constructed of an elastic material. The material must maintain elastic properties at the temperatures of the intended environment in which seal member 26 will be placed. It will be apparent to those skilled in the art that many fluorocarbon plastics are suitable for this usage. In many circumstances, it will further typically be most preferable to use a material, such as a fluorocarbon plastic which is heavily filled, such as with various percentages of metal powders, graphite, and/or fiberglass as is known in the art.

Figure 6:
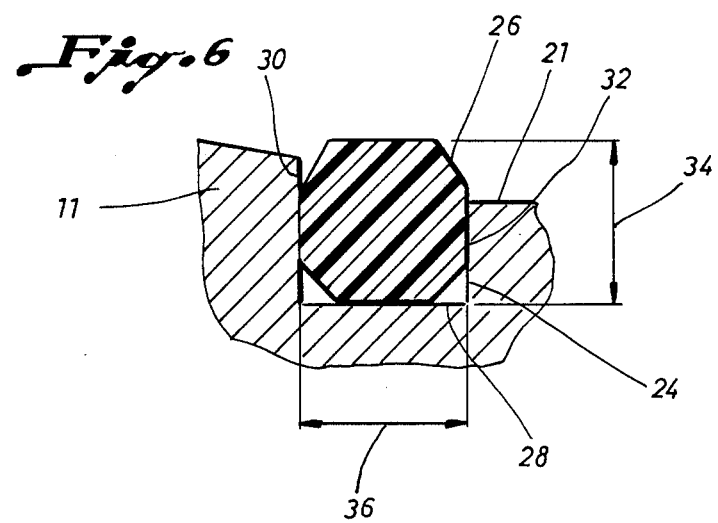
FIG. 6 is a cross sectional view of an unstressed sealing member in position on a sealing surface in accordance with the present invention.

Referring briefly to FIG. 6 of the drawings, therein is illustrated seal member 26 in a normal, or unstressed condition. Seal member 26 is preferably constructed to such dimensions that, when first member 11 is separated from second member 12, seal member 26 may be stretched over the lower portion of member 11 and will return to its original dimension holding it in general contact with bottom surface 28 of groove 24. Groove 24 is depicted as presenting a generally rectangular cross-section, in a preferred form thereof. When such a generally rectangularly formed groove is used, it is also preferable that seal member 26 have a generally rectangular form, although each corner of seal member 26 is preferably chamfered for reasons to be discussed herein below. It is optional that these chamfers do not remove more than one-half the surface area of any one side. Seal member 26 and groove 24 are preferably cooperatively sized such that seal member 26 is securely engaged within groove 24. It will be seen that seal member 26 protrudes above surface 21 of member 11 at both upper edge 30 and lower edge 32 thereof. The degree of this extension will vary between applications, but is preferably designed such that when tubular member 11 is engaged with tubular member 12 in the position in which a seal is desired to be established, the interference, or distortion, of seal member 26 in response to the pressure of surface 19 second member 12 will be approximately 6 to 10 times the interference designed for the metal-to-metal seal at contact area 22, up to a preferred maximum of 0.020 inches interference. It should be clearly understood that these ranges are exemplary only and represent only the most preferred form of the invention.

Seal member 26 should be cooperatively conformed with groove 24 such that a compression on seal member 26 or a pressure exerted on the extending portion thereof does not cause seal member 26 to leave its placement within groove 24. When seal member 26 and groove 24 are of generally rectangular forms, as illustrated, this may be achieved by maintaining the total height 34 of seal member 26 to a dimension preferably between two-thirds of or equal to length 36 of bottom 28 of groove 24. It is anticipated that other forms of seal members and grooves may cooperate to form this retention function, for example, cooperatively engageable dovetailed grooves and seal members.

Referring again to FIG. 2, it will be seen that when seal member 26 is compressed in response to the proximity of surface 19, seal member 26 distorts. The chamfered corners of seal member 26 facilitate the distortion of seal member 26 within the confines of groove 24. Because of the interference between seal member 26 and surface 19 as discussed above, a seal is formed as soon as members 11 and 12 are brought into the designed proximate relation to one another. When pressure is applied to seal member 26 from the direction of end 25 of member 11, seal member 26 will self energize and become more effective. The pressure will urge seal member 26 into increasingly secure engagement with surface 21. If seal member 26 is situated a distance from contact area 22, such that surfaces 19 and 21 diverge from contact area 22 in the direction of seal member 26, the elasticity of seal member 26 will allow it to distort into the decreasing dimension between surfaces 19 and 21 on the down-pressure side of seal member 26 forming an increasingly secure seal.

Similarly, relative thermal expansion of seal member 26 compared to members 11 and 12, due to the different thermal coefficients of expansion discussed above, will not cause seal member 26 to urge members 11 and 12 apart. In such a circumstance, seal member 26 will distort into the gap between surface 19 and surface 21 adjacent lower edge 32 of groove 24 and may also distort into the gap between surface 19 and surface 21 at upper edge 30 of groove 24, if such gap exists. Because of the distortion of seal member 26 into this annular space, seal member 26 does not serve to force members 11 and 12 apart, but does serve to effectively seal between them. Further, it will be appreciated that because seal member 26 is located prior to contact area 22 in the fluid pressure flow, seal member 26 serves to protect surfaces 19 and 21 adjacent contact area 22 from corrosive elements of the fluid flow. However, it will be appreciated that should a pressure flow be directed from the opposite direction, i.e., wherein it contacts the metal-to-metal seal at contact area 22 and causes it to vent, such pressure will then contact seal member 26 forcing it the reverse direction and causing it to distort in the opposite direction, into the gap between surfaces 19 and 21 and allowing such pressure to vent through the seal. If the pressure then reverses in the original direction, seal member 26 will be urged into its original engagement position and the seal will be reestablished.

Upper seal segment 14 is constructed in a similar manner to lower seal segment 16. It will be seen that a metal-to-metal seal is again preferably formed by the contact of seal surfaces 42 and 44. This metal-to-metal seal is adjacent the thread coupling. Seal member 48 is retained within a groove 50, preferably in surface 44 of box member 12. On the opposite side of seal member 48 from the metal-to-metal seal, a gap is again formed between seal surfaces 42 and 44, and seal member 48 will cooperate with the gap in the manner described with respect to lower seal segment 16.

It will be appreciated that because upper and lower sealing segments are placed at opposite extremes of the thread annulus (17 in FIG. 1), should any fluid be trapped within the thread annulus, a significant pressure caused by the expansion of that fluid will vent through either upper or lower sealing segment 14 or 16 in the manner described above, thereby preventing damage to the integrity of the threaded coupling. Although in this preferred embodiment, a metal-to-metal seal is formed between the two members, it is to be understood that such is not necessary for the practice of the present invention, though it is preferable that seal surfaces 19 and 21 converge to a location closely proximate one another.

Referring now to FIG. 3 of the drawings, therein is illustrated a coupling 60 between a first member 62 and a second member 64. It will be seen that the thread section 66 of the coupling includes a step-thread design as is known to the art for construction of high integrity casing and tubing couplings. It will be seen that upper and lower sealing segments 68 and 70 respectively are located proximate each end of thread section 66 and function in exactly the same manner as that described above wherein the thread section is continuous.

Referring now to FIG. 5 of the drawings, therein is illustrated a coupling 70 also including a step-thread design. Upper seal segment 72 is located intermediate the upper and lower thread sections 74 and 76, respectively. Thread couplings 74 and 76 have negative angle load flanks 78 on the threads, thus forming a hooked thread design. Metal-to-metal seal 80 is at a reverse angle from thread load flanks 78 and provides a stop shoulder for the thread coupling.

Referring now also to FIG. 4 of the drawings, therein is illustrate upper seal 72 of FIG. 5 in greater detail. Upper seal segment 72 has a metal-to-metal seal 80 formed by abutting shoulders 82 and 84 on tubular members 94 and 96, respectively. Seal 80 is in somewhat perpendicular relation to the axis of tubular members 94 and 96. Seal surfaces 86 and 88 are then preferably near seal 80 but relatively axially aligned with tubular members 94 and 96. Seal member 98 is retained within groove 100 in seal surface 86. Again, although a gap between seal surfaces 86 and 88 between seal member 98 and seal 80 is not essential to the present invention, such is typically necessary for the proper coupling of members 94 and 96. A gap is again formed on the opposite side of seal member 98 from seal 80. In the illustrated example, this is accomplished by a diverging angle between seal surfaces 86 and 88, said angle originating at the corner of seal 80. As discussed with respect to lower end seal 16 in FIG. 1, other means may be utilized of achieving this gap. Upper seal segment 72 operates in the same manner as do the previously described seal segments, sealing to pressure which has traversed upper thread coupling 74 while venting to pressure within lower thread section 76.

Many modifications and variations may be made in the methods and apparatus described herein and depicted in the accompanying drawings without departing substantially from the concept of the present invention. Accordingly, the preceding discussion is exemplary only and is not intended to limit the scope of the present invention.

We claim:

1. A threaded coupling that resists thread separation of two mating tubular members, comprising:
   an internally hook threaded box on one tubular member;
   an externally hook threaded pin on the other tubular member engaging the threaded box to resist jump out;

a stop shoulder between the two members;

a first seal surface on the box;

a second seal surface on the pin to form a metal-to-metal seal of selected interference with the first seal surface of the box;

a seal groove in one of the tubular members between the metal-to-metal seal and the end of the pin;

a gap between the seal groove and the end of the pin; and seal means seated in said seal groove with an interference in the range of substantially six to ten times the interference of the metal-to-metal seal wherein pressure build-up between the threads is vented into said tubular members and fluid flow from within said tubular members is isolated from the threads.

2. A threaded coupling that resists thread separation of two mating tubular members, comprising:

an internally hook threaded box on one tubular member;

an externally hook threaded pin on the other tubular member engaging the threaded box to resist jump-out;

a stop shoulder between the two members;

a first seal surface on the box;

a second seal surface on the pin to form a metal-to-metal seal of selected interference with the first seal surface of the box;

a seal groove in one of the tubular members between the metal-to-metal seal and the end of the pin;

a gap between the seal groove and the end of the pin; and seal means seated in said groove with a maximum interference of 0.020 inches wherein pressure build-up between the threads is vented into said tubular members and fluid flow from within said tubular members is isolated from said threads.

* * * * *